US008120669B2

(12) United States Patent
Meitav et al.

(10) Patent No.: US 8,120,669 B2
(45) Date of Patent: Feb. 21, 2012

(54) DIGITAL CAMERA WITH REDUCED IMAGE BUFFER MEMORY AND MINIMAL PROCESSING FOR RECYCLING THROUGH A SERVICE CENTER

(75) Inventors: Ohad Meitav, Haifa (IL); Daniel Seltz, Ben Lomond, CA (US); Itzhak Shenberg, Haifa (IL)

(73) Assignee: Zoran Corporation, Sunnyvale, CA (US)

( * ) Notice: Subject to any disclaimer, the term of this patent is extended or adjusted under 35 U.S.C. 154(b) by 0 days.

(21) Appl. No.: 12/572,117

(22) Filed: Oct. 1, 2009

(65) Prior Publication Data

US 2010/0020199 A1    Jan. 28, 2010

Related U.S. Application Data

(62) Division of application No. 10/458,893, filed on Jun. 10, 2003, now Pat. No. 7,612,803.

(51) Int. Cl.
*H04N 5/235* (2006.01)
*H04N 5/76* (2006.01)

(52) U.S. Cl. ............... 348/222.1; 348/207.1; 348/231.6; 348/280

(58) Field of Classification Search ... 348/231.99–231.9
See application file for complete search history.

(56) References Cited

U.S. PATENT DOCUMENTS

| | | | |
|---|---|---|---|
| 5,025,283 | A | 6/1991 | Robison |
| 5,144,442 | A | 9/1992 | Ginosar et al. |
| 5,473,402 | A | 12/1995 | Long et al. |
| 5,477,264 | A | 12/1995 | Sarbadhikari et al. |
| 5,867,214 | A | 2/1999 | Anderson et al. |
| 6,177,956 | B1 | 1/2001 | Anderson et al. |
| 6,229,926 | B1 | 5/2001 | Chui et al. |
| 6,259,826 | B1 | 7/2001 | Pollard et al. |
| 6,310,647 | B1 | 10/2001 | Parulski et al. |

(Continued)

FOREIGN PATENT DOCUMENTS

EP     1102479 A1    5/2001

(Continued)

OTHER PUBLICATIONS

ISA/EPO, "Notification of Transmittal of the International Search Report and the Written Opinion of the International Searching Authority, or the Declaration", mailed in corresponding PCT/US2004/015854 on Nov. 5, 2004, 13 pages.

(Continued)

*Primary Examiner* — Ngoc-Yen Vu
(74) *Attorney, Agent, or Firm* — Frommer Lawrence & Haug LLP; John W. Branch

(57) ABSTRACT

A digital camera system in which capture, processing and storage functions are partitioned differently than in existing systems. A hand-held digital camera is used with a workstation that may exist in a commercial image processing service center. A minimal amount of image data processing is performed in the digital camera, thereby allowing significant digital camera cost reductions due to lower memory requirements, lower processing requirements, and lower power requirements. Real-time single pass image compression techniques are employed within this digital camera to permit rapid gathering and storage of raw or minimally processed image data. The workstation to which the image data are transferred performs the image processing normally done within existing cameras. This processing takes advantage of the increased computational power that is possible to have in such a workstation, compared to that of a small camera, and the increased time over which such processing may be performed.

21 Claims, 6 Drawing Sheets

U.S. PATENT DOCUMENTS

| | | | |
|---|---|---|---|
| 6,396,948 B1* | 5/2002 | Lynch et al. | 382/166 |
| 6,433,818 B1 | 8/2002 | Steinberg et al. | |
| 6,525,302 B2 | 2/2003 | Dowski, Jr. et al. | |
| 6,762,791 B1 | 7/2004 | Schuetzle | |
| 6,961,085 B2* | 11/2005 | Sasaki | 348/222.1 |
| 6,995,794 B2 | 2/2006 | Hsu et al. | |
| 7,009,644 B1 | 3/2006 | Sanchez et al. | |
| 7,139,022 B1* | 11/2006 | Raffy | 348/273 |
| 7,362,970 B2* | 4/2008 | Atsumi et al. | 396/429 |
| 7,372,485 B1 | 5/2008 | Bodnar et al. | |
| 7,397,944 B2* | 7/2008 | Spampinato et al. | 382/162 |
| 7,454,055 B1 | 11/2008 | Payton | |
| 7,940,307 B2* | 5/2011 | Sasaki et al. | 348/221.1 |
| 2001/0030773 A1 | 10/2001 | Matsuura et al. | |
| 2001/0040625 A1 | 11/2001 | Okada et al. | |
| 2002/0018246 A1 | 2/2002 | Misawa | |
| 2002/0039139 A1 | 4/2002 | Hsu et al. | |
| 2002/0047904 A1 | 4/2002 | Okada | |
| 2002/0167599 A1 | 11/2002 | Carau, Sr. | |
| 2003/0001957 A1 | 1/2003 | Kubota | |
| 2003/0001959 A1 | 1/2003 | Tanaka et al. | |
| 2003/0007078 A1 | 1/2003 | Feldis | |
| 2003/0048358 A1 | 3/2003 | Shirai | |
| 2003/0058355 A1 | 3/2003 | Wong et al. | |
| 2003/0061236 A1 | 3/2003 | Culp et al. | |
| 2003/0184652 A1 | 10/2003 | Tanaka et al. | |
| 2004/0239775 A1 | 12/2004 | Washisu | |

FOREIGN PATENT DOCUMENTS

| | | |
|---|---|---|
| EP | 1198121 A | 4/2002 |
| JP | 5007336 A | 1/1993 |
| JP | 2001203969 A | 7/2001 |
| JP | 2002094931 A | 3/2002 |
| JP | 2003047023 A | 2/2003 |
| WO | 01/15440 A1 | 3/2001 |
| WO | 03/024083 A2 | 3/2003 |

OTHER PUBLICATIONS

Weiss, Peter, "Pictures Only a Computer Could Love" Science News Online; Week of Mar. 29, 2003; vol. 163, No. 13; URL: http://www.sciencenews.org/20030329/bob9.asp; 10 pages.

"JamCam 3.0 Digital Camera with Soft Blue Case", URL: http://www.baber.com/baber/cameras/jamcam.htm, Jun. 6, 2003, 2 pages.

Norton, Patrick, "JamCam 3.0. It's inexpensive and packs a punch. Find out why." Tech TV, URL: http://www.techtv.com/screensavers/print/0,23102,3348613,00.html, posted Sep. 19, 2001, 3 pages.

"JamCam Specification for Models 2.0 & 3.0", URL: http://home.hiwaay.net/~krcool/JamCam/jcspecs.htm, Jun. 6, 2003, 2 pages.

Presentations—Digital Graphics, URL: http://www.paj-online.com/presentations/graphics/gr_notes.html; last updated Mar. 13, 2002, 5 pages.

Kremens, Robert, "Fundamentals of Camera Image Processing", Pixel Physics, May 2001, 27 pages.

Kremens, Bob, "System Hardware, The Chandra Orbital X-Ray Observatory", Pixel Physics, May 2001, 11 pages.

Kremens, Bob, "System Hardware, A Digital Consumer Camera—The Jam Cam", Pixel Physics, May 2001, 13 pages.

European Patent Office; "Examiner's First Report"; Jun. 11, 2007; for corresponding European Patent Application No. 04 752 802.1; 5 pages.

* cited by examiner

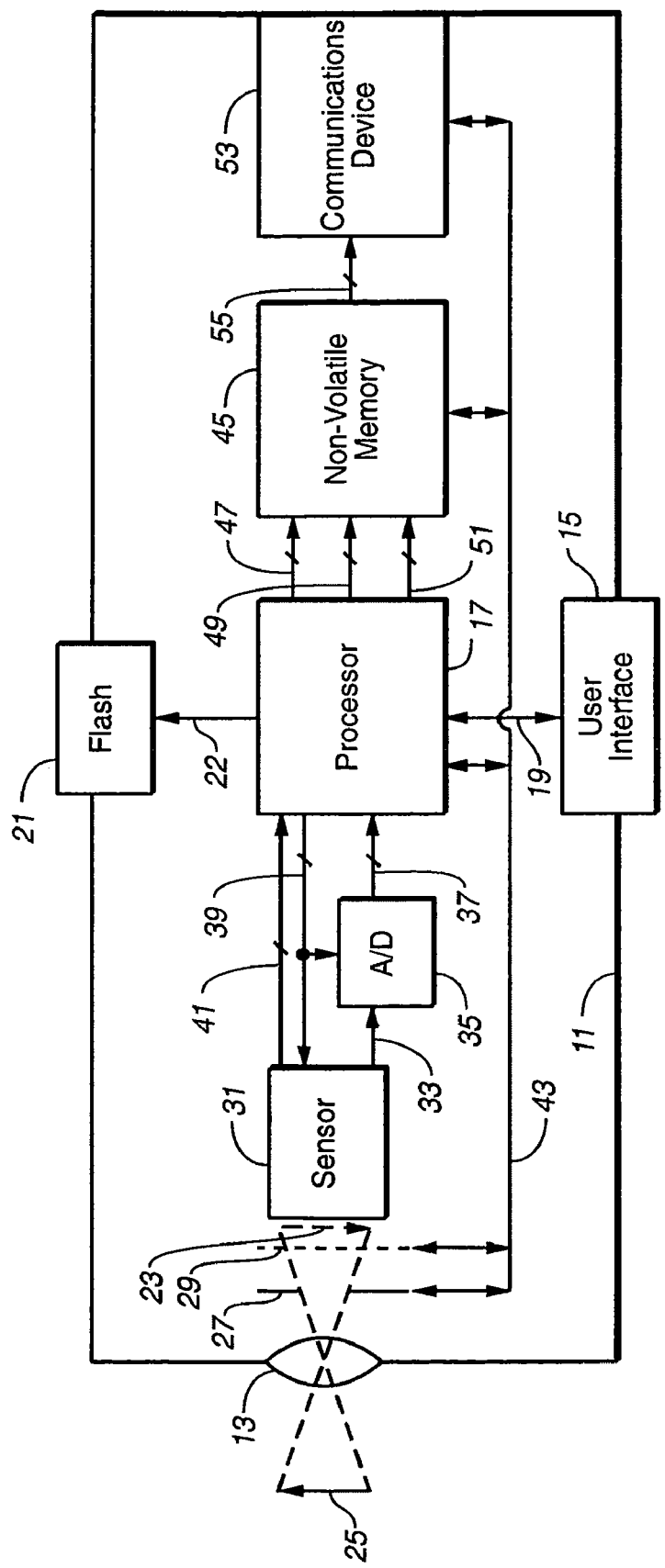
FIG._1
Hand Held Camera

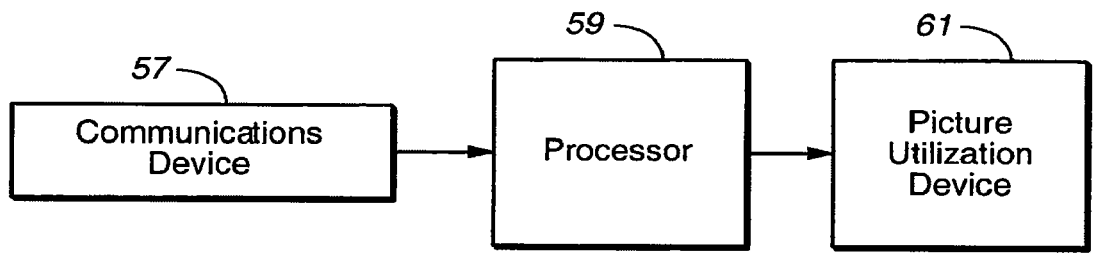
FIG._2
Workstation
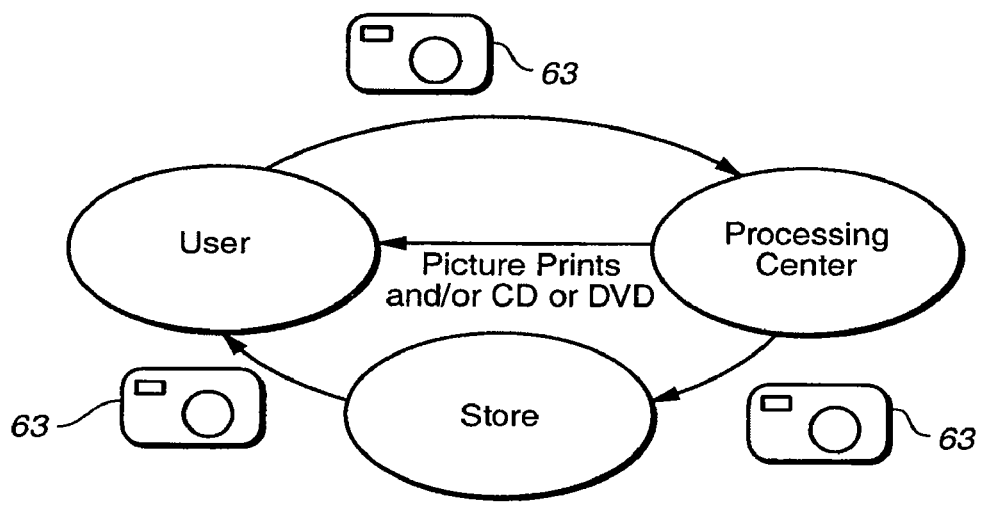
FIG._3
Business Method

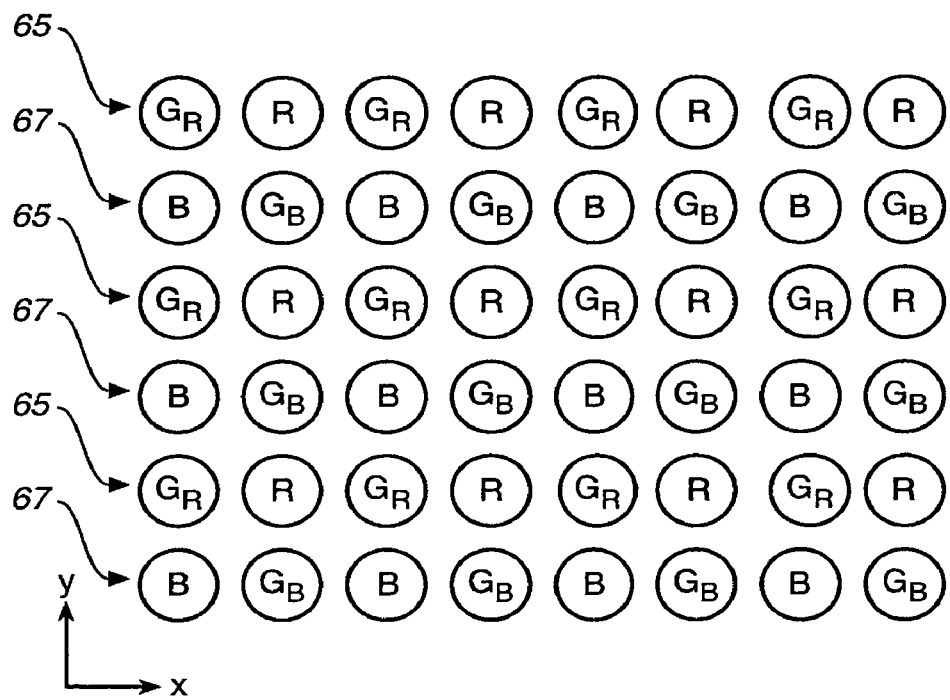
FIG._4
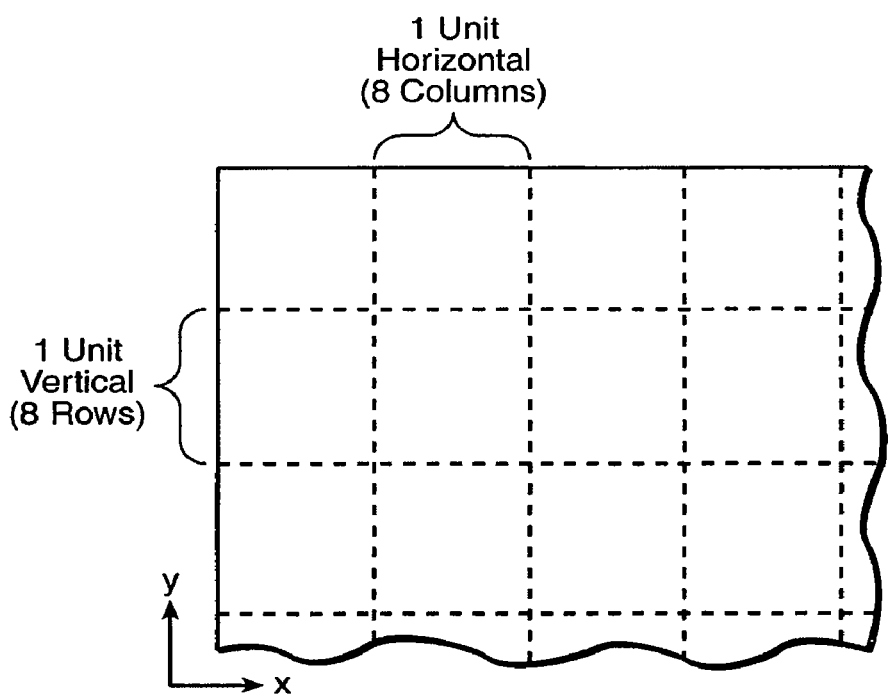
FIG._5
Image Frame

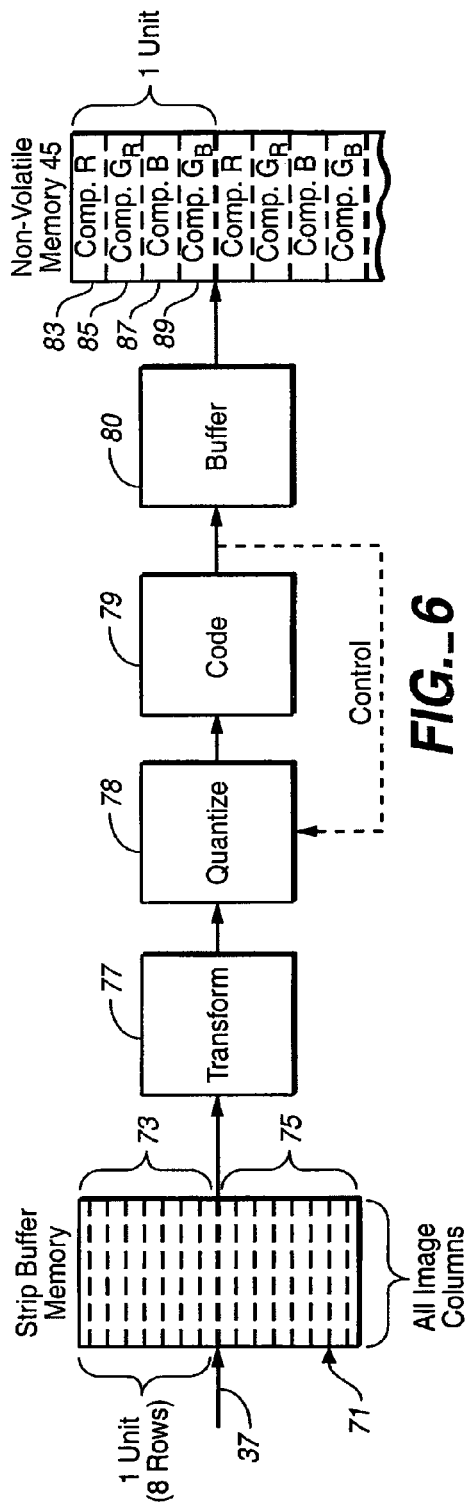
FIG._6
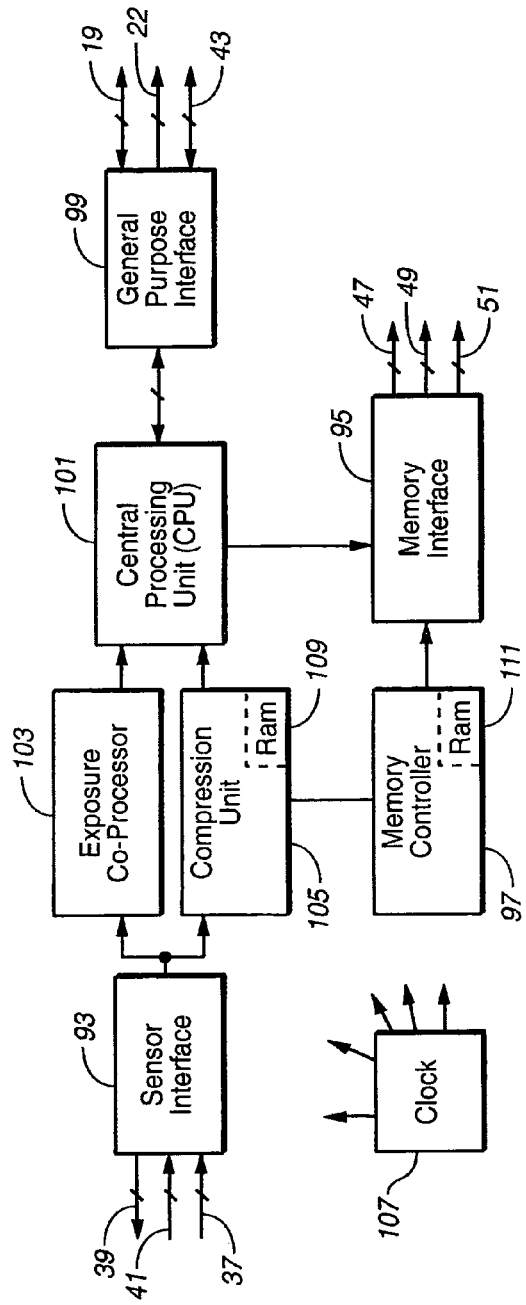
FIG._7 Camera Processor 17

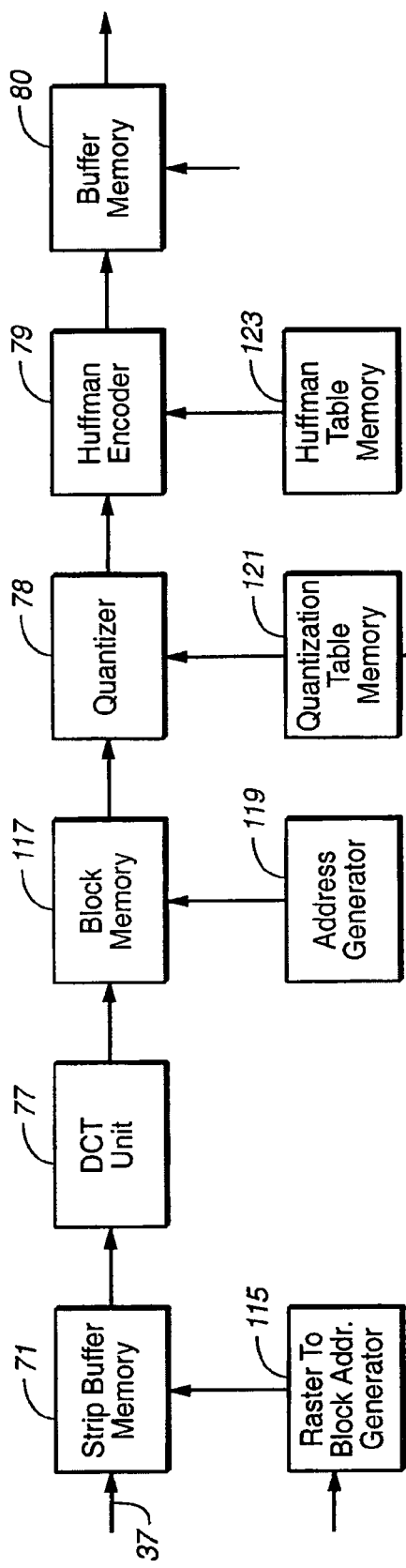
FIG._8 Compression Unit in Camera
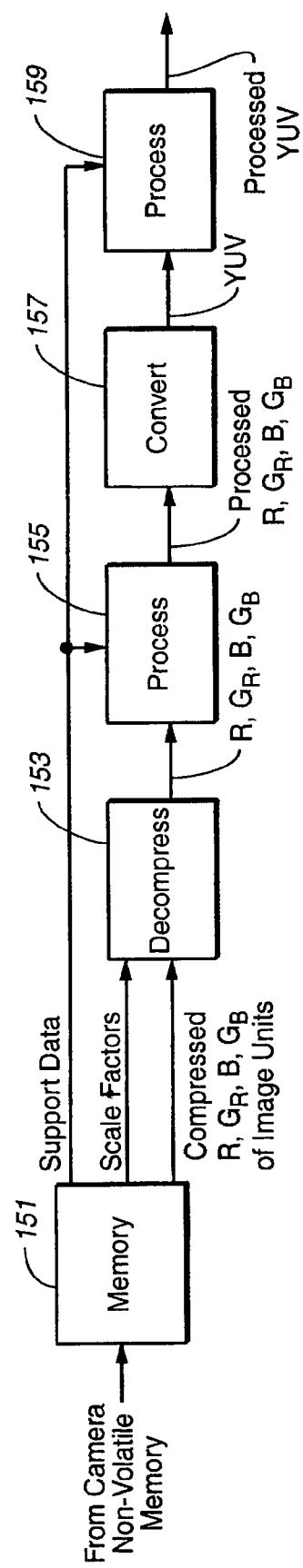
FIG._11 Workstation Processing

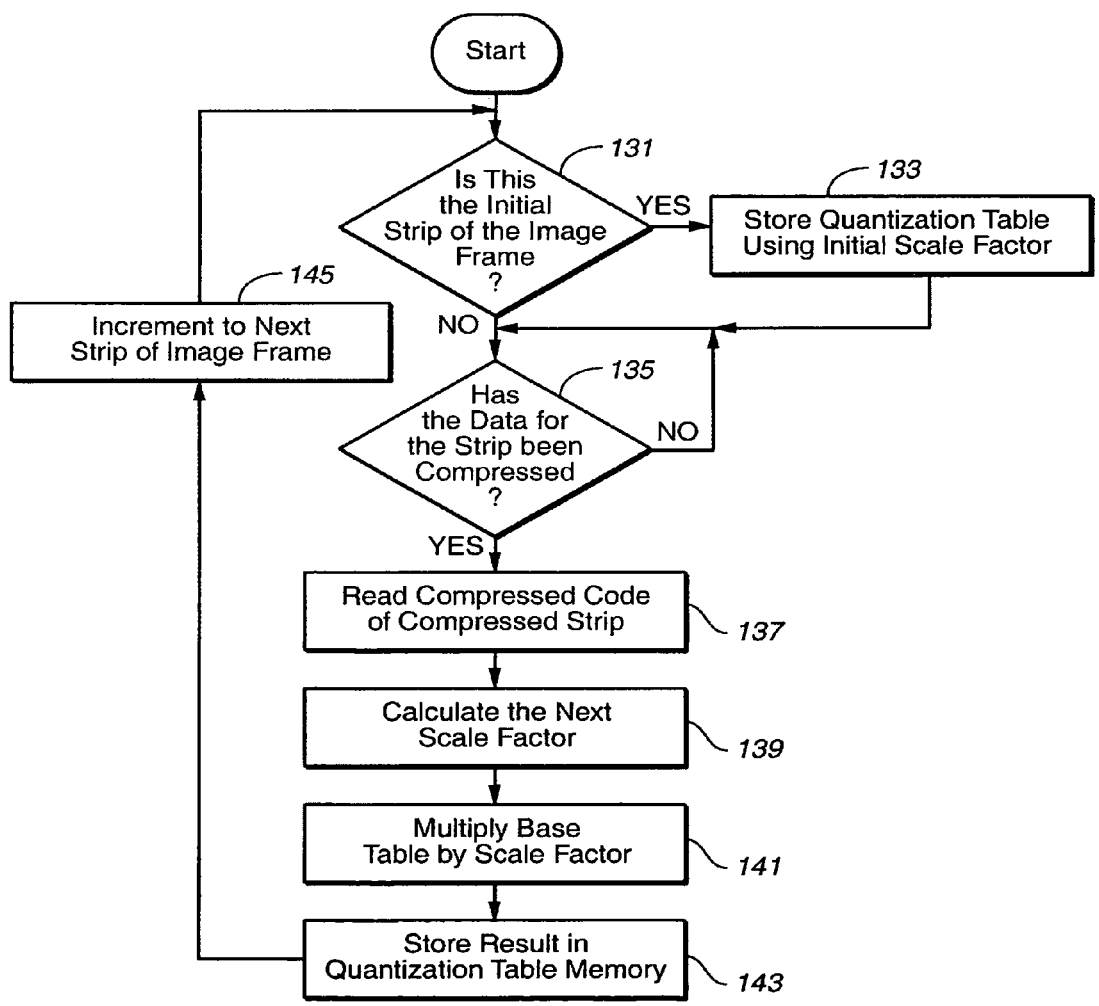

DIGITAL CAMERA WITH REDUCED IMAGE BUFFER MEMORY AND MINIMAL PROCESSING FOR RECYCLING THROUGH A SERVICE CENTER

CROSS-REFERENCE TO RELATED APPLICATION

This utility patent application is a Divisional patent application of allowed U.S. patent application Ser. No. 10/458,893, filed Jun. 10, 2003, the benefits of which are claimed under 35 U.S.C. §120, and is further incorporated herein by reference.

FIELD OF THE INVENTION

This invention relates generally to hand-held digital cameras and methods of using them, and, more specifically, to such a camera having a simplified electronic system and minimal image processing that is instead performed by a workstation to which data of images captured by the camera are transferred.

BACKGROUND

Electronic cameras image scenes onto a two-dimensional sensor such as a charge-coupled-device (CCD), a complementary metal-on-silicon (CMOS) device or other type of light sensor. These devices include a large number of photodetectors (typically two, three, four or more million) arranged across a small two dimensional surface that individually generate a signal proportional to the intensity of light or other optical radiation (including infrared and ultra-violet regions of the spectrum adjacent the visible light wavelengths) striking the element. These elements, forming pixels of an image, are typically scanned in a raster pattern to generate a serial stream of data of the intensity of radiation striking one sensor element after another as they are scanned. Color data are most commonly obtained by using photo-detectors that are sensitive to each of distinct color components (such as red, green and blue), alternately distributed across the sensor.

A popular form of such an electronic camera is a small hand-held digital camera that records data of a large number of picture frames either as still photograph "snapshots" or as sequences of frames forming a moving picture. A significant amount of image processing is typically performed on the data of each frame within the camera before storing on a removable non-volatile memory such as a magnetic tape cartridge or a flash memory card. The processed data are typically displayed on a liquid crystal display (LCD) device on the outside of the camera. The processed data are also typically compressed before storage in the non-volatile memory in order to reduce the amount of storage capacity that is taken by the data for each picture frame.

The data acquired by the image sensor is typically processed to compensate for imperfections of the camera and to generally improve the quality of the image obtainable from the data. The correction for any defective pixel photodetector elements of the sensor is one processing function. Another is white balance correction wherein the relative magnitudes of different pixels of the primary colors are set to represent white. This processing also includes de-mosaicing the individual pixel data to superimpose data from spatially separate monochromatic pixel detectors of the sensor to render superimposed multi-colored pixels in the image data. This de-mosaicing then makes it desirable to process the data to enhance and smooth edges of the image. Compensation of the image data for noise and variations of the camera optical system across the image and for variations among the sensor photodetectors is also typically performed within the camera. Other processing typically includes one or more of gamma correction, contrast stretching, chrominance filtering and the like. Several of these image processing functions and others are described in an outline of Robert Kremens, "Fundamentals of Camera Image Processing," dated May 2001, made available on the Internet by the Rochester Institute of Technology (R.I.T.), Center for Imaging Science, Digital Imaging and Remote Sensing Group, and Pixelphysics, Inc. It is the processed data that are displayed on the camera's LCD screen so that the displayed image appears to the user of the camera as it will when the stored data are later displayed or printed.

The processed data are also typically stored in a full frame buffer memory included in the camera. Data is then read from this buffer memory for compression by a data compression algorithm. A single frame may be compressed more than once by use of different compression algorithm parameters until the compressed data file conforms to some predetermined criteria, such as a total size less than some set limit. So uncompressed data of the full frame is stored in the buffer memory a period necessary for this compression processing to take place. Such a buffer is typically implemented by a volatile memory on an integrated circuit chip separate from a processor chip in the camera and is chosen to have a very fast access time.

Recyclable, single-use hand-held digital cameras for taking still photographs are also available. Such a camera is purchased by an end-user for a price that is much lower than that of a conventional digital camera. It is used by the end-user in a manner similar to a conventional digital camera, until a number of pictures have been taken to fill its internal non-volatile memory. At this point, the end-user returns the recyclable camera to a service center for processing of the stored pictures. Subsequently, the pictures are returned to the end-user as hardcopy prints or on a standard storage medium such as diskette or compact disk (CD). The camera is then refurbished by the service center, or the camera's manufacturer, including erasure of its internal memory, and then returned to a retail point-of-sale such as a camera store, drug store and the like to be resold—hence the term "recyclable". A recyclable digital camera has only internal electronic memory for storage of pictures. It has no removable storage memory, no means for a user to display a captured image, and no means for the end-user to retrieve the stored pictures by transferring them to a personal computer. The stored pictures can only be retrieved by the service center by means available to the service center. The recyclable digital camera is analogous to a single-use photographic film camera in its model of manufacture, usage, processing and recycling to point-of-sale. For this business model to be viable, the recyclable digital camera is designed to be inexpensive to manufacture, and at the same time, the quality of the pictures delivered to the end user by the service center are made to be high. Currently, recyclable digital cameras use a method of capturing and storing data of pictures that is identical, or very similar, to that used in conventional digital cameras described above.

Because picture data compression is utilized in the recyclable camera, the number of pictures that can be stored in the camera is sufficient to make it attractive to end-users without the expense of a large internal non-volatile memory. The compression is performed using a method such that the resulting compressed picture is in a standard format used by a large majority of digital cameras, the JPEG standard format. The service center produces hardcopy prints from these JPEG format image files, or computer readable media carrying pictures in JPEG format, or both, depending upon requests of the customers.

SUMMARY OF THE INVENTION

According to one principal aspect of the present invention, the process of converting the digital image from the sensor in the camera to the format that is ultimately delivered to the end user is partitioned between the camera processor and a data processing workstation, such as a workstation in a commercial service center, in a way that minimizes the amount and complexity of processing done in the camera. It does this by transferring a majority or all of the image processing traditionally performed within digital cameras to the workstation. Raw or nearly raw digital data of the signal output of the image sensor, or a compressed version of it, are acquired and stored within the camera and then transferred to the workstation. In addition to this image data, various support data may be stored along with the image data within the camera in order to facilitate processing by the workstation to which the data are transferred. Such support data can be derived from a prior camera calibration, from an additional sensor within the camera, from a second image taken under different conditions or obtained from an analysis within the camera of the image data itself. In addition to reducing the complexity and cost of the camera in this way, the workstation can also provide more powerful processing that has been considered to be too costly, too physically large, too time consuming or too power consuming to be included in a digital camera. This results in pictures with significantly improved quality being obtained by the end-user with a digital camera of reduced complexity and cost.

According to another principal aspect of the present invention, image digital data is compressed within the camera in real-time and in a single-pass through the acquired sensor data in a manner that also reduces the complexity and cost of the digital camera. The method of compression implemented in the camera's processor is not constrained by the convention of compliance with a standard, such as the Joint Photographic Experts Group (JPEG) standard, since the workstation can be complementarily configured to receive the compressed data from such a camera, yet the advantages of JPEG compression can still be realized. The entire digital image frame received from the sensor need not be stored in an image frame buffer memory, prior to compression, as is commonly done in most digital cameras. Instead, only a small portion at a time of the digitized data of an image frame needs to be stored prior to compression. By this means, a separate digital memory integrated circuit chip normally dedicated to storage of the image prior to compression can usually be eliminated from the camera, thus reducing its complexity, eliminating operational constraints imposed by the separate memory and reducing the manufacturing cost. If temporary storage of the entire image frame is required at all, it is only of the reduced size compressed picture frame, not the much larger amount of data of the image frame prior to its compression. Thus, the total need for temporary image data storage can be reduced considerably. At the workstation at the service center or otherwise, the compressed pictures are retrieved from the non-volatile memory in the digital camera used to store the captured image work product, and decompressed. After decompression, the workstation completes the processing of the image data to optimize picture quality and correct for imperfections in the camera, all the processing that commercial digital cameras now do, as outlined above, and more. The decompressed and processed image data is then put into a form for utilization by a color printer, for writing onto a CD or DVD, or some other end use. When preparing the data into standard format files for writing onto a CD, the workstation processes the pictures by compressing the data into a standard, such as the JPEG format standard.

According to a further aspect of the present invention, a digital camera may be configured to take at least two pictures of the same scene in rapid succession, and then process the data of the two images to produce a single image of the common object scene that has a quality that is better than the quality of either of the acquired images, that corrects for defects in the acquired images and/or which compensates for limitations of camera. For example, the effect on the image of defective pixels of the image sensor can be eliminated when the image on the camera sensor is shifted by at least one pixel between the two exposures, an extremely small shift that certainly occurs between two successive exposures with a hand-held camera. Data of portions of one image containing the effects of defective sensor pixels are replaced by data of the same portions of the object scene acquired by the other image, which, because of the camera motion between pictures, are acquired by different sensor pixels. The effects of fixed pattern noise of the sensor, the camera optics and the electronic system can corrected in the same way. An advantage of making these corrections in this way is that they are dynamic; that is, changes in the sensor or optics over time are corrected automatically without having to separately measure them. Another example is increasing the light sensitive dynamic range of the camera sensor by acquiring two or more images of the same object scene under different exposure conditions and then combining them. This allows restoration of details of portions of an acquired image that are either predominately dark or bright because of sensor pixels being saturated. Further, image details that are blurred by a camera moving during exposure may be sharpened by making two such exposures in rapid succession and then processing the data of both images with an inverse smearing algorithm.

The aspects and features of the present invention described above may either be implemented individually or together in various combinations, depending upon the application. Further, additional aspects, advantages and features of the present invention are included in the following description of exemplary examples thereof, which description should be taken in conjunction with the accompanying drawings. All patents, patent applications, articles and other publications referenced within this document are hereby incorporated herein by this reference in their entirety for all purposes.

BRIEF DESCRIPTION OF THE DRAWINGS

FIG. 1 is a schematic diagram of a hand-held digital camera;

FIG. 2 is a block diagram of a workstation for image data acquired by the digital camera of FIG. 1;

FIG. 3 illustrates the business method of using a recyclable digital camera and a service processing center;

FIG. 4 shows an example arrangement of pixels of an image sensor of the camera of FIG. 1;

FIG. 5 schematically illustrates a portion of an image frame;

FIG. 6 conceptually shows one aspect of the image data processing carried out by the processor within the camera of FIG. 1;

FIG. 7 is a block diagram of an example processor of the camera of FIG. 1;

FIG. 8 is a block diagram of an example compression unit of the processor of FIG. 7;

FIG. 9 illustrates a preferred example order of reading pixels from a unit of image frame data by the data compressor;

FIG. 10 is a flow chart showing one aspect of the operation of the compression unit of FIG. 8; and FIG. 11 provides an example technique for the workstation of FIG. 2 to de-compress and further process image data received from the camera of FIG. 1.

DETAILED DESCRIPTION OF EXEMPLARY EMBODIMENTS

An example video acquisition data device in the form of a hand-held camera is shown in the schematic diagram of FIG. 1. The camera is schematically shown to include a case 11, an imaging optical system 13 and a user interface, 15 that communicates with a processor 17 over lines 19. The interface 15 includes user operated switches and controls, as well as indicators of the operation and status of the camera. An optional light flash unit 21, controlled by the processor 17 through lines 22, may also be included. Such a hand-held digital camera can be small, a camera body having dimensions less than 14 cm. long by 8 cm. high by 5 cm. thick, and even smaller at less than 8×4×2 centimeters, with the lens normally protruding from the body.

The optical system 13 can be a single lens, as shown, but will normally be a set of lenses. An image 23 of a scene 25 is formed in visible optical radiation through an adjustable aperture 27 and a shutter 29 onto a two-dimensional surface of an image sensor 31. An electrical output 33 of the sensor 31 carries an analog signal resulting from scanning individual photo-detectors of the surface of the sensor 31 onto which the image 23 is projected. The sensor 31 typically contains a large number of individual photo-detectors arranged in a two-dimensional array of rows and columns to detect individual pixels of the image 23. Signals proportional to the intensity of light striking the individual photo-detectors are obtained in the output 33 in time sequence, typically by scanning them in a raster pattern, where the rows of photo-detectors are scanned one at a time from left to right, beginning at the top row, to generate a frame of video data from which the image 23 may be reconstructed. The analog signal 33 is applied to an analog-to-digital converter circuit chip 35 that generates digital data in circuits 37 of the image 23. Typically, the signal in circuits 37 is a sequence of individual blocks of digital data representing the intensity of light striking the individual photo-detectors of the sensor 31.

In the example camera of FIG. 1, the processor 17 includes a system clock, and a clock signal is supplied by the processor to the sensor 31 and analog-to-digital converter 35 over lines 39. Additional timing signals for synchronizing operation of the sensor 31 and the processor 17 are also generated in the processor 17 and supplied over lines 41 to the sensor 31. Alternatively, a separate system clock may be utilized and/or the synchronizing timing signals may be generated in the sensor 31 and supplied to the processor 17 instead. The processor chip 17 is connected through control and status lines 43 to the variable aperture 27, the shutter 29 and other components of the camera in order to control them.

Data of images captured by the camera may be stored in a non-volatile memory 45 that is installed within the camera. The memory 45 can be a commercially available semiconductor flash electrically erasable and programmable read-only-memory (EEPROM), small removable rotating magnetic or optical disk, magnetic tape, volatile semiconductor memory with a battery back-up or other non-volatile memory in which video data of image frames acquired by the sensor 31 can be stored. Data of a large number of individual frames of data are programmed into the memory 45 over lines 47 from the processor 17 as the sensor 31 acquires these data. Control lines 49 allow the processor 17 to control operation of the memory 45. Additional image support data useful or necessary for subsequent processing of the image data are also programmed in the memory 45 over lines 51 along with the image frame data that they support. As explained elsewhere, in order to minimize the cost of the camera, little or no processing of the image data is performed in the camera of FIG. 1 except that it is preferable to compress the data before storage in a reasonably sized memory 45, to enable the camera to be able to take and store a sufficient number of image frames before the capacity of the memory is exhausted.

Although the memory 45 could be made to be physically removable from the camera by use of a flash memory card or removable small hard disk system, the memory 45 in this example is permanently installed within the camera case 11. When the user wants to transfer the image frame data out of the camera, it is done through a communications device 53 that receives data read out of the memory 45 over lines 55. The communications device 53 can take a number of different forms, such as a socket into which a cable is connectable to an image processing workstation, an infra-red digital data transmission device, a radio-frequency signal transmitter, or other type of wireless data communications link.

With reference to FIG. 2, a workstation for processing the image data read from the camera memory 45 is generally shown. A communications device 57, complementary with the camera communications device 53, receives the data from the camera. This can be by cable, infra-red transmission, radio frequency transmission, or the like. A processor 59 processes the received image data. This processor can be a personal computer, network server or the like. The processed image data are then applied to some device 61 that utilizes this data. The device 61 can be a color printer that provides prints of the image data or some other non-volatile memory device that stores the image data such as a CD or DVD burner, a magnetic disc drive, a flash memory card or a magnetic tape drive. If the image data stored in the camera memory 45 has been compressed, then the processor 59 will de-compress the data. But a primary function of the processor 59 is to perform the image processing normally performed in digital cameras but not performed in the low-cost camera of FIG. 1. The additional processing power and time available in a computer external to the camera allows such image processing to be performed better and also allows other types of processing not now performed in hand-held digital cameras to be done. The processing done by the processor 59 also interfaces with the utilization device 61, such as including a software printer driver when the device 61 includes a printer, normal JPEG compression when the device 61 includes a CD or DVD storage unit, and the like.

FIG. 3 shows one use of the simplified digital camera of FIG. 1, as a recyclable camera. Such a camera 63 is initially purchased by an individual user from a retail store. After its internal non-volatile memory 45 has been filled to capacity with data of pictures taken by the user, the camera 63 is taken by the user and surrendered to a commercial processing center containing a workstation as described above with respect to FIG. 2. The image data stored in the non-volatile memory of the camera 63 are then read out of the memory and into a memory of the workstation. These data are then processed in a manner described below to correct and enhance the images in ways currently done within hand-held digital cameras, since this processing is by design omitted from the camera 63 of FIG. 1, and more. Photographic prints, a CD with the image data stored in a JPEG compressed form, and the like, as ordered by the user, are then produced from the data. The memory 45 of the camera 63 is then erased by the processing center, and the camera sent to a retail store for purchase by another user.

The processing center shown in FIG. 3 is a commercial facility, where the user of a digital camera of the present invention brings his or her camera to download data to an image processing work station, complete the image processing cycle, and obtain hardcopy prints and/or storage medium, such as diskette, CD or DVD, with standard digital image files derived from their digital image data augmented by linked support data, stored thereon. Such a series of steps would be followed if the digital camera is a recyclable camera and has only internal electronic memory for storage of pictures, no removable storage memory, no means for the camera user to retrieve stored pictures by transferring them to a personal computer or some other device, and is designed to be refurbished by the service center, or the camera's manufacturer, and returned to a point of sale to be resold.

However, this usage model does not necessarily have to be the case. If the digital camera of FIG. 1 employed by the end user includes a standard means, such as an USB 2.0 or IEEE 1394 interface, for downloading digital image data augmented by linked support data, to another device, or to a removable non-volatile memory, the image processing workstation of the present invention need not be located at a commercial facility. It can, alternatively, be located in the end user's home and take the form of a USB compatible personal computer, loaded with appropriate image processing software, that has CD or DVD-R or RW recording capability. It can also take the form of a DVD recorder, with a USB interface or a removable memory interface connector, that incorporates image-processing software based on the principles described herein. Such a DVD recorder additionally includes a user interface which allows the end user to complete the processing cycle and transcode the user's image data to one or more standard image formats, with at least one of these formats being playable on any DVD player. The presence of a USB or IEEE 1394 interface on such a DVD recorder further allows the end user to create hardcopy prints of his or her processed image data on one of many color printers now available to consumers.

Further details of the structure and operation of the camera of FIG. 1 will now be described. The sensor 31 may be a charge-coupled-device (CCD), a complementary metal-on-silicon (CMOS) device or other similar type of light sensor. A large number of photodetector elements (typically two, three, four or more million) are arranged across a small two-dimensional surface that individually generate a signal proportional to the intensity of light or other optical radiation (including infrared and ultra-violet regions of the spectrum adjacent visible light wavelengths) striking the element. These elements, detecting pixels of an image, are typically scanned in a raster pattern to generate a serial analog signal in the output 33 that gives the intensity of radiation striking one photodetector element after another as they are scanned. Color data are usually provided by the use of light filters in front of the photodetectors that limit their sensitivity to one of distinct color components such as red, green and blue.

FIG. 4 illustrates a portion of a two-dimensional array of photosensitive detectors of individual pixels of the image 23 in a color mosaic that may be utilized within the sensor 31, according to one widely used standard. Alternate rows 65 each include photodetectors that are alternately sensitive to green ($G_R$) and to red (R), while the photodetectors of the intervening rows are sensitive to blue (B) and to green ($G_B$). There are twice as many photodetectors sensitive to green than are sensitive to red or blue since the eye is more sensitive to green. Although the green sensitive photodetectors are the same across the array, those in the rows 65 are denoted as $G_R$ and those in the rows 67 as $G_B$ to distinguish those in the red rows from those the blue rows, respectively. Data from the green sensitive photodetectors in the red rows are treated separately from those in the blue rows in the examples described herein.

Although image processing is totally or nearly totally omitted from the camera of FIG. 1, in order to minimize its complexity and cost, it is currently desirable to compress the image data prior to storing it in the non-volatile memory 45. This allows the storage of data of a sufficient number of images in the memory 45 that makes the camera commercially desirable without having to incur the cost of a very large capacity memory. This could change as the cost of memory continues to decline, in which case the primary color data from the sensor 31 would be, after being digitized, stored directly in the memory 45 with little or no additional processing. The examples herein, however, provide for image data compression within the camera of FIG. 1.

The compression algorithm that is described herein for use in the camera is a modified form of the JPEG compression algorithm. Referring to FIG. 5, data from the photodetectors of the sensor array are grouped into those obtained from blocks of the array of the sensor 31 that each contain a set number of rows and columns of photodetectors. In the example shown, each block contains 8 rows and 8 columns but other numbers of rows or columns can be defined to be within a block instead. In this example, the data from the R, $G_R$, B and $G_B$ pixels within each unit are compressed separately and stored in the memory 45.

This image data compression is conceptually illustrated by FIG. 6. A small volatile buffer memory that is part of the processor 17, all preferably on a single integrated circuit chip, receives the stream of image pixel data from the analog-to-digital converter 35. This data is written as it is received for the lines of the image frame in order across the array of the sensor 31, alternately for lines of R/$G_R$ and B/$G_B$ pixels. Once enough data is captured in the buffer 71 for a processing unit's number of image lines, in this example of FIG. 6, across all columns of the display, reading of the data from the buffer 71, in a different order than written, is commenced for the compression processing and continued as data from other lines below those already captured are written into the buffer. As shown in FIG. 6, data compression functions 77-80 are performed on data read from 8 lines of the image frame data that are stored in a first section 73 of the buffer while data of the next 8 lines are being written into a second section 75. Thereafter, data are read from the second section 75 for compression while new data for the next 8 lines of the image are written into the first section 73, and so on, until the data of the entire image frame has been written into and read from the buffer memory 71. The reading of data from the memory 71 and their compression preferably occurs as fast as the data can be written into the memory 71, in order to maintain the speed of the process.

Once one of the sections 73 or 75 of the buffer memory 71 has been filled with the 8 image data lines, this data is read in a different order one unit at a time from all those lines, 8 columns of pixels per unit in this example. Data from all the red (R) pixels of the first unit may be read, compressed and stored in a region 83 of the camera memory 45, followed by the same for the green ($G_R$) pixels in the read row, the compressed data being stored in a region 85 of the memory 45. Similarly, the blue (B) and green ($G_B$) data are read from the same unit in sequence and their compressed versions stored in respective regions 87 and 89 of the memory 45. This completes the compression and storage of the first unit of image frame data stored in one section of the buffer 71. The process is then repeated for the second unit of data stored in the same buffer section until all the units of data across the 8 lines of data stored in one section have been read, compressed and the compressed data written to the memory 45. This is then repeated for data stored in the other section of the buffer 71, until completed, and thence back to the first section, and so on, until all the data of the image frame has been compressed and stored in the non-volatile memory 45. Once this has occurred, data of another image may be acquired by the sensor 31 and the process repeated on a new set of image data.

This processing technique has a major advantage of requiring the buffer memory 71 to be significantly smaller than that of the usual digital camera wherein such a buffer stores all the data of at least one image frame. Such a full frame buffer for storing uncompressed data is typically implemented by using a separate integrated circuit memory chip in the camera and connected to the processor. But this is expensive and the necessary fast data transfer between two chips tends to create a noisy environment that has to be worked around. Here, the buffer 71 is small enough that it can be included on the processor integrated circuit chip. The buffer 71 can be less than 15% or 10%, or even less than 5%, of the size of a full frame buffer, depending upon the relative number of lines in a frame and in a unit (FIG. 5) of processing. It is possible for the buffer 71 to be 2% or less than the size of a full image frame buffer.

The data compression illustrated generally in FIG. 6 is performed in real time as image data are acquired from the sensor 31, and with a single pass of that data. The compression steps illustrated in FIG. 6 are typical of JPEG standard processing. In step 77, a discrete cosine transformation is taken of the data of one color at a time for a single display unit. The transform coefficients are then quantized in the step 78, and Huffman encoded in a step 79. The encoded data are then written to a buffer memory 80 which serves to synchronize the rate at which data are encoded by the step 79 and the rate at which this encoded data may be written to the non-volatile memory 45. If a flash memory is employed for the non-volatile memory 45, the buffer 80 needs to be large enough to store data at a high rate while this data is written to the memory 45 at a slower rate since the programming of currently available flash memories is relatively slow. In any event, since the image frame data are compressed at this point, the buffer 80 need not be so large as to require a separate memory chip in the camera. The compression illustrated by steps 77-80 can be implemented by either software or hardware, a primarily hardware implementation being described below.

The amount of data that results from the compression is controlled by monitoring the data output of the encoder 79 and adjusting the quantization level of the step 78 in response, as shown by the dashed line in FIG. 6. If the amount of compressed data resulting from one strip across the image frame of 8 lines of pixels is too high, the quantization level can be adjusted for the compression of the next strip of data. A single such adjustment is made small, however, so that there is no visible effect on the resulting decompressed image from strip-to-strip. In other camera designs that have a full frame buffer, the image frame data may be compressed more than once with different quantization levels until a compressed data file of a desired size is obtained. But in the camera system being described herein, there is only one chance to do the compression, with the significant advantages of not requiring a full frame buffer prior to compression and speeding up the compression processing which results in reducing the time delay between the acquisition of successive images.

The camera processor 17 (FIG. 1) performs a minimal amount of pre-processing of the image data from the sensor 31, before beginning the process of image compression. In one embodiment, it performs no pre-processing at all, thus reducing to zero the cost of the pre-processing function, and retaining a maximum amount of information pertaining to the raw sensor image data for use in the processing done outside the camera in the workstation. Pre-processing functions traditionally performed by existing digital cameras but rather performed by the workstation herein are, for example, defective pixel correction, white balance compensation, black level correction, contrast stretching, de-mosaicing, gamma correction, pixel format conversion, edge enhancement, chrominance filtering, and lens shading compensation. This data processing is performed for the purpose of correcting, enhancing or otherwise improving the quality image of the original scene that is eventually formed from the processed data. These data manipulations are typically independent of any compression of the data that may additionally take place. Compression of the image data into a smaller quantity of data representing a captured image, and then the reconstruction of the image data therefrom by decompression, does not affect the resulting image except for losses that are usually inherent in the compression process. Data compression does not have a purpose or effect of correcting, enhancing or otherwise improving the quality of the image.

It may, however, be desirable to maintain simple defective pixel correction pre-processing in the camera since an uncorrected pixel could cause some compression techniques to introduce compression artifacts. But except for simple defective pixel correction, all of these pre-processing functions are preferably performed in the workstation rather than the camera, thus simplifying the camera and bringing more processing power to the tasks than cannot practically be included in the camera anyway.

In order to facilitate these processing functions by the workstation, the digital camera of FIG. 1 can store support data linked with the compressed captured image data, on a picture-by-picture basis, in the non-volatile memory 45. Support data can take the form of one or more additional full or partial images, acquired under different imaging conditions, at one or more predefined time intervals after or before the image of the scene of interest is acquired. Since the compression operations of the present invention are performed in real-time, in a single pass, and are deterministic and predictable with regard to compression time, compressed output data rate and compressed data size, as image data are read from the sensor, these predefined time intervals are repeatable and can be quite short. Therefore, these additional images correlate well with the scene of interest. The support data are preferably compressed in the same manner as acquired image data in order to reduce the amount of the memory 45 required to store these data. Alternatively, the support data may be sub-sampled or averaged by the camera processor 17 before storage in the memory 45, in order to reduce support data storage requirements. To further reduce memory use, only predefined image regions, or image regions responsive to predefined criteria, can be stored as support data in the memory 45. Data defining these predefined regions of interest would also be stored in this memory. Additionally, support data can be parameters of the specific camera that are measured and stored in an appropriate memory of the camera during a factory calibration or which are dynamically determined or adjusted during the camera's use. The support data linked with captured data of an image makes possible certain corrections, enhancements and/or other improvements of the quality of the image by the workstation's manipulation of the image data received from the camera. In order to provide the workstation with support data that can be employed to significantly improve the quality of the final. pictures, support data can be captured under the following circumstances:

1) With light blocked from the image sensor, by the use of the mechanical shutter 29, to allow for correction for fixed pattern noise of the sensor;

2) Of the same object scene but at a different exposure level or levels as compared to the image of interest to provide data to permit correction for sensor gray scale characteristics and improve picture dynamic range;

3) At a different time delay interval or intervals between capturing the image of interest and capturing support data to permit the determination and correction of camera motion that occurred during the acquisition of data of the object scene image of interest;

4) At a different sensor position or positions, relative to the scene of interest being captured, to facilitate the detection and correct of defective pixels. Note that small positional offsets naturally occur between images captured in rapid succession. Because of this image offset on the sensor, image data read at a first time by a defective pixel will be read at a second time by a neighboring working pixel. Thus, a short time delay between scene of interest capture and support data capture provides the information needed for the image data processing workstation to replace erroneous data from a defective pixel with good image data; and 5) At the time of digital camera factory calibration.

The first example above, fixed pattern image sensor noise correction, provides a good illustration of the support data concept. This type of noise results from the slightly different characteristics of the individual photodetector elements of the sensor array. The level of noise is temperature-dependent, and therefore dynamic, meaning that it varies over time, so the noise pattern needs to be measured at a time close to when the picture is taken. In one example, this is done by reading out the support data from the image sensor immediately following the capture of the scene of interest. In this case the image used for the support data needs to be a "black image"; an image captured with no light falling on the image sensor. By including the mechanical shutter 29 in the digital camera, all light can be blocked from the image sensor at the appropriate time. This support data is compressed and stored in the same way as the image data that represents the scene of interest, except that the targeted volume of the compressed code can be much smaller, since the dynamic range of the noise is much smaller than that of the main image. Therefore, the compressed data size of the support data is far smaller than the compressed data size of the scene of interest data. At the processing service center, the support data and the scene of interest data are decompressed, and, on a pixel-by-pixel basis, the support data values are subtracted from the corresponding scene of interest pixel data values. Since the support data values are from a black image, taken only a short time after the scene of interest image data was captured, they represent the black level noise value of each sensor element at the time of image of interest was acquired. In this manner, correction for image sensor fixed pattern noise is made outside the camera by the workstation.

If the camera of FIG. 1 employs an image sensor 31 having additional elements outside the periphery of the image area that are covered by a material that prevents light from impinging on these elements, the data samples from these dark elements can serve as support data. In the workstation, this support data is used to estimate the black-level noise in the image area. The additional elements in one type of image sensor can consist of a single column of elements on the left or right edge of the image area. When each row of the sensor is read out, its associated dark element is read out also. Since the rows are read out sequentially, the noise, which generally accumulates over time, changes from row to row, and data from the dark element provides a measurement of the black level noise. When the image is subsequently processed outside the camera by the workstation, the output of the dark element is subtracted from the values of all the other elements in that row, thus removing the time-varying noise from the image.

The second example above, improvement of image sensor dynamic range, provides another example of use of support data concept. When a scene of interest is captured at a particular exposure level, there will typically be regions of the image in which details cannot be discerned because they are below a minimum brightness threshold or above a maximum brightness threshold. The technique is to capture the same image one or more additional times in succession but at different exposure levels. The data from these additional image captures serve as the support data for the workstation. This is possible in the digital camera of FIG. 1, without incurring appreciable motion between captured images, because off the real-time, single pass image compression and storage method described above. In the workstation, a composite image is created that has a greater amount of visible gray scale detail than any of the individual pictures, thus enhancing the image dynamic range.

Note that for this form of dynamic range enhancement to be effective, all the captured data present in the additional images need not be stored with the image data and be available as support data for the workstation. For example, the support data dynamic range information can be stored in the form of low resolution versions of the additional images, processed versions of the additional images which contain dynamic range information responsive to image content, or compressed versions of the additional images. In addition, the image processing workstation should be aware of the conditions under which the support data was acquired in order to utilize the support data to enhance the dynamic range of the image of interest. For example, these conditions can be that an additional image is captured with a longer exposure time than the scene of interest, to reveal details in the shadow regions of the scene that were not visible in the first image, and/or an additional image is captured with a shorter exposure time than the scene of interest to reveal details in the highlights of the scene that were not visible in the scene of interest. In the workstation, known image registration methods are used to correct for small amount of movement, if any, between the two images. For each equivalent element, the data from the first image could be left-shifted to increase its range, and the support data would be added to it, in order to create a composite image with extended dynamic range.

Imperfections of the lens 13 and other portions of the camera optics, such as lens shading, can also be corrected in the workstation by storing dynamic support data relating to the optics together with an acquired image. In one example, the lens is calibrated at each zoom and focus setting by the factory at the time the camera is manufactured, and measured calibration data is stored as static information in the non-volatile memory. When an image is captured, the zoom and focus settings are stored together as support data with the compressed data from the image of interest, and the optics correction data for those settings are read out by the workstation and there used to perform lens shading correction.

Yet another example of the use of support data and workstation image processing is where data of a viewable image is not produced within the digital camera of FIG. 1 at the time of image capture. The digital camera of this example could use a computer-optimized lens. This lens purposely distorts the image impinging on the sensor. The distortion created is removed by the subsequent processing in the workstation. In this case, the lens distortion characteristics are stored with the image data in the digital camera's non-volatile memory 45. This lens distortion data is stored in the non-volatile memory of the camera at the time of camera manufacture. In one specific example of such a camera configuration, use of such a lens can enhance the depth of field of the final processed picture, as described in Science News, Vol. 163, No. 13, Mar. 29, 2003, p. 200. A key characteristic of the raw image produced by such a lens is that it is blurred; that is, the image 23 cast onto the sensor 31 (FIG. 1) does not contain visible sharp edges, and consequently, the image can be compressed more efficiently than the image produced by a conventional lens. In fact, the image can be compressed more efficiently by the camera processor 17 than if the distortion-removing processing were done in the camera processor, before compression of the image data. As a result, the compression can be done with less severe quantization, therefore producing a higher-quality final picture than is possible with a conventional camera lens or a camera in which the distortion-removing processing is done before the compression.

Returning to the camera of FIG. 1, the structure and operation of the processor 17 will now be described. The processor 17, in one embodiment, performs the following functions:

1) Control of the image sensor 31, including optional generation of signals with the timing required to operate the sensor;

2) Readout of the data from the sensor 31, for both data of an image of interest and support data, including monitoring timing signals generated by the sensor, or optionally, those generated by the processor 17;

3) Computation of the required sensor exposure time;

4) Compression of the digitized sensor data;

5) Storage of the compressed data in the non-volatile memory 45;

6) Management of the available storage space by adaptively controlling the compression process; and 7) Management of the user interface 15 of the camera.

A block diagram of an embodiment of the processor 17 is shown in FIG. 7. The processor includes an image interface 93 that connects with the sensor 31 and analog-to-digital converter 35 in the manner described above. A memory interface 95, with an associated memory controller 97, connect with the non-volatile memory 45 over lines 47, 49 and 51 that are previously described. A general purpose interface 99 connects the processor 17 with the user interface 15, the other electronic components within the camera, and with the flash unit 21. The processor 17 also includes a central processing unit (CPU) 101, an exposure control co-processor 103, a compression unit 105 and a clock generator 107.

The image sensor interface 93 reads the digitized image data from the sensor 31 appearing on lines 37 by sampling the data synchronously to a clock signal provided on lines 39 by the image sensor interface 93 and associated timing signals in lines 41. Depending on the particular type of sensor chosen for the camera, the timing signals can be generated by the sensor 31 or by a timing generator associated with the sensor. The image data acquired by sensor interface 93 is sent to two destinations, the exposure control co-processor 103 and the compression unit 105.

The exposure co-processor 103 accumulates measurements of the illumination of the sensor. The unit acts as a co-processor for the CPU 101, which uses these measurements of illumination to determine the required timing of the shutter 29 and to signal the sensor 31 when to terminate the exposure. This method of exposure control is the same as that used in conventional digital cameras.

The compression unit 105 includes a random-access-memory 109 for the strip memory 71 (FIG. 6). Parameters of the compression are adjusted adaptively from strip to strip, in order to ensure that the compressed image fits into the space allocated for it in the non-volatile storage memory 45 (FIG. 1). The computations for the adaptation can be done entirely by the CPU 101, or by the CPU with assistance from a co-processor in the compression unit 105, or entirely in the compression unit. The CPU 101 executes instructions stored in a read-only memory and has a small amount of read-write memory for use in calculations.

The memory controller 97 of FIG. 7 buffers the compressed image data produced by the compression unit 105 in a memory 111 that is organized as a first-in-first-out (FIFO) memory, and then writes these data via the memory interface 95 into non-volatile storage memory 45 (FIG. 1). The FIFO memory 111 implements the functions of the buffer 80 (FIG. 6) described above. The CPU 101 also has access via the memory interface 95 to the non-volatile storage memory 45 (FIG. 1).

In a conventional digital camera, pre-processing includes de-mosaicing. This process results in a representation known as YCbCr, in which a luminance Y value is assigned for each element of the sensor array. Color components Cb and Cr, in which one CbCr pair is associated with two or four Y elements, are represented with a lesser resolution. Thus, the total number of YCbCr values that result, and which are subsequently compressed, is 2 or 1.5 times the number of elements in the array. The YCbCr representation is used because it is the standard representation used by computer software to display digital photographs and because it allows for more efficient compression than would result from compressing a representation in which there is a RGB triplet of values for each element of the array, another standard representation. Note that image sensors normally provide the digitized sensor element values as 10-bit data, but 8-bits are used for each of the Y, Cb and Cr values. So the 10-bit data must be converted to 8-bits at some point in the usual de-mosaic pre-processing operation that occurs in the conventional digital camera.

In the camera of FIG. 1, no de-mosaicing is performed. De-mosaicing is postponed until the picture is processed by the workstation. The compression is performed within the camera on the image data as they are received from the sensor's analog-to-digital converter 35. Before compression, as described above with respect to FIG. 6, the element values corresponding to each color are separated into individual arrays, and each color array is compressed independently of the others. To improve the quality of the de-mosaicing performed outside of the camera by a workstation, it is advantageous to treat the green elements in the same rows of FIG. 4 as the red elements ($G_R$) separately from the green elements in the same rows as the blue elements ($G_B$), as is described above. Thus, the compression is done on four component arrays of color element values, R, $G_R$ $G_B$, B. The number of elements in each array is one quarter of the total sensor elements.

To avoid steps that remove potentially useful information and to preserve as much as possible to be used subsequently by the service center's de-mosaicing computation, the compression is done on arrays of 10-bit data values. This has an additional advantage in preserving the full dynamic range of the sensor data, which the workstation can use to correct errors in the exposure control performed by the camera processor device. It is known that one of the effects of the quantization performed during the compression of the image may be some reduction of dynamic range, but this reduction is a local effect and by averaging larger regions of the image in the workstation processing, the dynamic range information for exposure correction purposes can be preserved.

A block diagram of the image compression unit 105 (FIG. 7) of the processor 17 is shown FIG. 8. Since the compression was described above in general terms with respect to FIG. 6, blocks of FIG. 8 that perform the same function as blocks already described are given the same reference number. The method of compression is broadly similar to the JPEG compression used in conventional cameras, but has some modifications that improve its characteristics for the single-pass operation in the present embodiments.

The first step is to store the digitized sensor data in the temporary strip buffer memory 71. The data arrives on lines 37 at the input to the buffer row-by-row, as previously described. The buffer 71 holds one strip of 16 rows of the image and is therefore called a strip buffer. The buffer can be envisaged as four separate buffers, each holding a strip of 8 rows of the image elements, one for each color component. A raster-to-block address generator 115 addresses the memory 71 so that when the contents of the buffer are read out, the order of the elements is changed. As described in detail in the JPEG standard, one block at a time, consisting of 8 rows and 8 columns of adjacent elements of a color component, known as an 8×8 block, is read out, with the single-color-component blocks interleaved, but in a manner that best suits the application. For example, if the JPEG standard were followed to the letter, the interleaving would be [R], [$G_R$], [$G_B$], [B]. In this application, however, a more appropriate interleaving would be [R], [$G_R$], [R], [$G_R$], . . . , [$G_B$], [B], [$G_B$], [B], . . . , [R], [$G_R$]; [R], [$G_R$], . . . , [$G_B$], [B], [$G_B$]. [B], . . . , where the bracketed symbols represents 8×8 blocks of the respective elements. This is because, in the line-by-line mosaic arrangement of the sensor (FIG. 4), the first 8-row strips of R and $G_R$ elements would be complete and ready to be read out significantly before the first 8-line strips of $G_B$ and B elements. The number of [R] and [$G_R$] blocks read out before starting to read out [$G_B$] and [B] blocks depends on the width of the sensor, that is, the number of photodetector elements in a row.

When a block of image elements has been read from buffer 32, the space occupied by those elements is free for acquisition of the next strip. One simple way to manage the memory occupancy is to provide for enough buffer memory for two complete strips, and to alternate between the strip buffers, reading from one while the other is being written into. The address generator 115 is straightforward in this case. It is also possible to reduce the amount of memory required to one strip only, by implementing a more complicated address generator, so that the memory space freed when a block has been read out is over-written by the new elements from the next strip.

As each color block of image data is read out of the strip buffer 71, it is applied to the discrete cosine transform (DCT) unit 77 that computes a discrete cosine transformation, generally in the detail specified by the JPEG standard. One difference in the implementation of this application and that used in conventional digital cameras is that a higher precision of the results is retained, since the precision of the input to the unit is 10 bits rather than 8 bits. To be specific, 13 bits of precision are retained rather than 111 bits. The 8×8 array of results output by the DCT unit, called DCT coefficients, are stored temporarily in a block memory 117 because it must be read out in a different order before the next step of the process. To avoid stalling the DCT unit 77, the memory 117 includes two-blocks of memory, which allows one block of results to be read out of one block of memory while the next block of results is being written into the other block of memory.

The DCT coefficients are read out of the block memory 117 by an address generator 119 in an order that, on average, maximizes the length of runs of zero-valued coefficients. In the JPEG standard the order is a zigzag order, in which coefficients are read out sequentially along diagonals. Since adherence to the JPEG standard is not required, a readout order that improves on the zigzag order can be used. For example, a readout order in which the distance from the top left-hand element to the element read in the two-dimensional 8×8 block increases monotonically, can be employed. This is shown in FIG. 9, which indicates the read order by sequential numbering. The selection of this alternate readout order is based on the observation that the magnitude of DCT coefficients decreases, on average, with distance from the top left corner of the block, thus improving the chances that the length of runs of zero-valued coefficients will increase. As will be discussed in the following paragraph, by using this readout order, rather than the standard zigzag order, a lower average level of quantization can be used in the image compression process, and, consequently, there is less alteration of the image as a result of compression.

The DCT coefficients are quantized in a quantizer 78 of FIG. 8 by using one of a selection of existing technologies, which employ a table 121 of quantization values. The quantized DCT coefficients at an output of the quantizer 78 are then Huffman encoded by a Huffman encoder 79 by use of standard Huffman encoding techniques. Huffman encoding is employed to further reduce the amount of compressed data generated. While Huffman encoding is being performed, the number of bits or other units of output are also counted and made available to CPU 101 of the processor (FIG. 7).

An output of the Huffman Encoder 79 is packed into bytes and stored temporarily in the code memory 80, organized as a FIFO, and subsequently stored permanently by memory controller 97 (FIG. 7) in non-volatile memory 45 (FIG. 1) in the form of flash memory. The size of the code memory 80 that is required depends on the characteristics of the flash memory. If the flash memory has a short enough programming time per byte, the code memory 80 only needs to store a portion of the compressed image code so that the code is produced in the code memory and written into the flash memory on the fly. If the flash memory is too slow for this mode of operation, the code memory 80 can be made large enough to contain the compressed code of the whole image.

A single-pass compression method is used, which avoids the necessity of storing the uncompressed raw image in a frame buffer that would be required for multiple passes. This eliminates the need for a large random access memory in the system. Multiple passes are typically used in conventional digital cameras, to ensure that the compressed code size does not exceed a set limit, which is calculated so as to allow for a guaranteed minimum number of pictures to be stored in the non-volatile storage provided for this purpose. In addition to this, there are other reasons for providing enough memory to store a complete uncompressed image in conventional cameras. One reason is to allow the digital camera's processor to perform automatic white balance before compressing the image. In the system described herein, white balance processing is performed by the workstation, not by the processor within the camera. Another reason is to support the ability to play back stored pictures and directly display them on a television monitor. This playback function is not included in the camera system described herein.

The single-pass compression is achieved within the camera of FIG. 1 by allowing the quantization tables in the memory 121 (FIG. 8) to be changed from strip to strip of the image frame. The JPEG standard does not allow such an adaptation of the quantization tables within a single image frame. The adaptation of the quantization tables in the memory 121 is carried out by the CPU 101.

In general the compression process illustrated in FIG. 8 makes use of a base quantization table, or a set of base quantization tables, one for each color component or group of similar components. For optimum performance, suitable base quantization tables are best chosen in advance by conducting experiments with a representative set of images, and the sensor to be used in the cameras, but failing this, base tables that are known from experience to be useful for many similar applications can be found in the literature, for instance the tables provided as samples in the JPEG standard. To determine the actual quantization table to be used in compressing an image strip, each base table is multiplied by a scale factor. This scaling operation preserves the overall shape of the table, but changes the level of quantization of each quantization factor in the table. Since the same base tables can be used by a workstation decompressing the image data received from the camera, only the scale factor for each strip needs to be stored in the camera's non-volatile memory 45, along with the compressed code representing the image, in order for the workstation to reconstruct the actual quantization tables used during compression.

This aspect of the single-pass compression process is shown in FIG. 10. The data are compressed one image frame strip at a time. After compression of the data of each strip, the quantity of compressed code is measured and the measured quantity used to adjust the quantization level scale factor for the next strip in order to adjust the amount of code that will result from compressing the next strip. In a step 131, it is determined whether the strip being compressed is the first strip of the current image frame that is being compressed. If so, in a step 133, the base quantization table values are multiplied by an initial scale factor and loaded in the quantization table memory 121 (FIG. 8) before compression of the first strip begins. The initial scale factor may be chosen by conducting experiments in advance with a representative set of images. Whether the initial strip of an image frame or not, as indicated by a step 131, the illustrated portion of the processing waits until the data of the given strip of image data has been compressed with a quantization table adjusted by a determined scale factor. The remaining steps shown in FIG. 10 cause a scale factor to be determined for use in compressing the next image frame strip in order.

Once the data of a strip have been compressed, the amount of compressed code of the strip is read by the CPU 101 (FIG. 7), in a step 137 (FIG. 10). The CPU 101, in a step 139, then calculates the scale factor to be used for the next strip. If more compressed code than desired is found to exist, the scale factor is set for the next strip to reduce the resulting amount of code. Conversely, if less compressed code than is acceptable, the scale factor for the next strip is selected to increase the amount of code. The quantization table used for compression of the next strip is then adjusted accordingly (step 141) and stored (step 143) in the quantization memory 121 before compression of the next strip begins. By a step 145, the portion of the processing illustrated by FIG. 10 then shifts to that next strip and the sequence repeats by reference to the amount of compressed code obtained from the data of the next image strip.

The adjustment of the scale factor makes use of a table of target accumulated code volumes, one per strip, which is prepared by the CPU 101 before starting to compress the image. The target strip code volume is the amount of compressed code that is allocated to each strip, and a target accumulated code volume is the sum of the target strip code volumes of all strips up to and including the current strip. The same target strip code volume could be used for each strip, or, preferably, the table can be biased towards the strips containing the center portion of the image, allocating more of the total image compressed data to the region typically of most interest, where it is most important to minimize the degradation in image detail caused by the quantization. As an example, 70% of the total image compressed data could be allocated for the central 50% of the height of the image, and 15% to each of the remaining 25% portions at the top and bottom.

If after compressing an image strip the sum of the strip code volumes up to and including that strip exceeds the target accumulated code volume of the strip, the scale factor for the next strip is increased, to increase the amount of quantization and hence the amount of compression. To avoid visible effects at the strip boundaries due to abrupt scale factor adjustment, it is preferable to increase the scale factor by only a small amount per strip. If after compressing a strip the sum of the strip code volumes up to and including that strip is less than the target accumulated code volume of the strip, the scale factor is reduced by a small amount, but is not allowed to be smaller than a predetermined fraction of the initial scale factor. The optimal value for this fraction can be determined empirically by testing with sets of representative images.

By using the single-pass compression method with scale factor adjustment just described, it is possible to closely satisfy the constraint that the accumulated code volume of the whole image not exceed a target amount. Consequently, the number of compressed images that can be stored in a given amount of storage memory is predictable. This permits a much higher level of image quality to be achieved as compared with a single-pass implementation of the JPEG standard compression, which does not employ scale factor adjustment, for the same degree of predictability.

Using the real-time compression method described above, in an embodiment in which the amount of temporary memory 80 (FIG. 8) is minimized to store data of only a portion of a complete compressed image, the speeds of the compression and programming of the non-volatile memory 45 (FIG. 1) must be matched. Since the programming speed of certain types of non-volatile memory such as flash memory is typically slower than that of SRAM or DRAM, the memory speed potentially limits the minimum compression ratio that can be used. To deal with this, the rate at which sensor data is read out can be slowed down, thus reducing the rate at which the compressed data is produced. When the sensor is operated in the commonly-used electronic-shutter mode, the reduction of readout rate is limited by the image skewing that can result from too-slow readout, when there was relative motion between the camera and the scene. The readout rate can be further reduced if a mechanical shutter is used, because the exposure of all parts of the sensor stops at the same time. A slower readout rate can also be achieved without a mechanical shutter, by employing an image sensor of a type having storage elements associated with each light-sensing element. In this sensor configuration, when the exposure of the sensor is complete, the outputs of all sensor elements are stored simultaneously on their respective storage elements, and then the storage elements are read out at a rate that is less than when the storage elements are not present.

In addition to the processing described above, the processor 17 (FIG. 1) can also monitor the buttons that constitute the user interface 15 of the camera, for example the shutter button and a mode selection button, and control an optional status display that is also part of the user interface 15, that displays, for example, the number of pictures captured into the non-volatile storage memory. Other functions of the processor can be to control the exposure of the image by controlling the time delay between the shutter trigger and the read-out of the image from the sensor, and to provide a control signal to trigger the optional flash strobe. These latter functions can be performed by a separate controller, but for reasons of cost, the same processor 17 is preferably employed to also perform these additional functions.

The improvements to the camera processing described herein allow the processor 17 to be realized as a very small integrated circuit. In fact, since a CMOS sensor uses the same integrated circuit manufacturing technology as the CMOS technology required for a processor, the processor 17 (including the partial frame image data buffer), analog-to-digital converter 35 and sensor 31 may be formed on a single integrated circuit chip. This is made practical by the real-time compression techniques described above, since only a fraction of a full image frame buffer is required for storing data prior to compression. Elimination of the full frame buffer makes it unnecessary to have the usual high-speed memory interface with the processor 17. Such a high-speed memory interface can introduce unacceptable noise into the sensitive image sensor.

An example of the processing performed by the processor 59 of the workstation of FIG. 2 is illustrated in FIG. 11. Data for a number of images are transferred from the camera non-volatile memory to some appropriate memory 151 within the workstation. A file for each image contains compressed data of the image plus support data of the type described above and at least the quantization scale factors for each strip of the image that were used by the camera for image data compression. In the specific examples described, these data are in the form of compressed units of the image data, separately for each of the R, $G_R$, B and $G_B$ color components. In a first processing step 153, these data are decompressed to give uncompressed forms of the R, $G_R$, B and $G_B$ color data. The decompression algorithm is, of course, complementary to the compression algorithm used in the camera to compress the image data and uses the same base quantization table. The scale factor used with each strip of the image to compress its data in the camera is then' used to derive the same quantization table values used for decompression of each strip of data in the workstation.

A block 155 of FIG. 11 indicates processing of the decompressed image data of the type normally performed in digital cameras, as discussed above. A next processing step 157 optionally converts the image data from an RGB color space to a luminance and chrominance color space such as YUV, YCrCb or YIQ. One reason is because some of the processing normally performed in digital cameras, which is now being done in the workstation, is best performed on the data when in a luminance/chrominance format. A step 159 indicates such processing, an example of which is white balance correction. Another reason for performing the conversion 157 is that some uses of the output of the processing shown in FIG. 11, such as display on a standard television monitor, require or prefer data in a luminance/chrominance format.

Further, not shown in FIG. 11, some applications will include compression by workstation processor 59 (FIG. 2) of the output image data according to a generally recognized standard, such as by the JPEG standard, for optimized use by the picture utilization device 61 of FIG. 2. For example, if the image data are to be stored on a CD or DVD optical disk, by a picture utilization device such as a CD or DVD burner, such compression would be needed. A consumer owned playback device, such as a CD or DVD player, would then decompress the image data according to the standard for display.

It will be recognized that several of the unique techniques described above, such as that incorporating, support data with image data stored in the non-volatile memory of a digital camera to permit optimized image processing by a workstation and the feature of performing most or all image data pre-processing in the workstation rather than the camera, do not depend on image compression to be effective. As the cost of suitable non-volatile memory drops, the camera of FIG. 1 could be implemented without compression of any type being employed but still realize the benefits of the features described above. Further, although the various aspects of the present invention have been described with respect to exemplary embodiments thereof, it will be understood that the present invention is entitled to protection within the full scope of the appended claims.

What is claimed as new and desired to be protected by Letters Patent of the United States is:

1. A method of processing a frame of data from a sensor of an image thereon within a hand-held camera having a two-dimensional array of photodetecting elements that generate data, in a plurality of primary colors, comprising within the camera:
   reading the image data from the photodetecting elements in a time sequence in different ones of the primary colors;
   writing the image data of different ones of the primary colors into a first memory in the order read from the photodetector in sequential strips across the image;
   reading the image data of individual image strips from the first memory in groups of image data of different ones of the plurality of primary colors;
   wherein the writing and reading occur at rates wherein less than fifteen percent of the frame of image data are stored in the first memory at one time;
   compressing the groups of image data of different ones of the plurality of primary colors within individual strips across the image read from the first memory; and
   storing the compressed groups of image data in a second memory within the camera that is non-volatile.

2. The method of claim 1, wherein storing the compressed groups of image data in the second memory includes utilizing a memory permanently connected within the camera as the second memory.

3. The method of claim 1, wherein no processing occurs in the camera for displaying the image data.

4. The method of claim 1, wherein no processing occurs in the camera for any of de-mosaicing, white balance correction, gamma correction and lens compensation.

5. The method of claim 1, additionally comprising within the camera:
   reading and storing in the second memory compressed groups of a plurality of frames of image data; and
   transferring the stored compressed groups of a plurality of frames of image data from the second memory to a workstation outside of the camera.

6. The method of claim 5, additionally comprising within the workstation:
   decompressing the compressed groups of image data; and
   processing the decompressed groups of image data to form data files for the plurality of frames in a form from which images may be reproduced.

7. The method of claim 6, wherein the processing within the workstation includes all of de-mosaicing, edge enhancement, white balance correction and gamma correction.

8. The method of claim 7, wherein no processing occurs in the camera for any of de-mosaicing, edge enhancement, white balance correction and gamma correction.

9. The method of claim 6, additionally comprising within the camera:
storing in the second memory characteristics of camera optics used to form the image on the sensor.

10. The method of claim 9, wherein the characteristics of the camera optics are transferred from the second memory of the camera to the workstation, and wherein the processing within the workstation includes compensating the image data for the characteristics of the camera optics.

11. The method of claim 10, wherein no processing to compensate for characteristics of the camera optics is performed within the camera.

12. A hand held camera, comprising within an enclosure:
a two-dimensional sensor having an array of individual photodetectors of optical radiation that generate signals related to optical radiation directed onto the sensor in a plurality of primary colors;
an optical system positioned through the enclosure to direct a field of optical radiation from outside the camera onto the sensor;
a first memory receiving and temporarily storing data of values of the optical radiation directed onto the individual detectors of the sensor in a time sequence, the first memory having a storage capacity of an amount of data less than fifteen percent of an amount of data generated by the individual detectors of the sensor to represent one field of optical radiation directed onto the sensor;
a processor that reads out the data in the first memory and compresses the data for each of the plurality of primary color;
a second memory that stores the compressed data of a plurality of fields of optical radiation in a non-volatile manner; and
a communications device connected to the second memory for communicating the compressed data files outside of the enclosure.

13. The camera of claim 12, wherein at least the sensor, the first memory and the processor are formed on a single integrated circuit chip.

14. The camera of claim 13, additionally comprising an analog-to-digital converter connected to receive the signals from the sensor and provide digital signals for the processor and the first memory, and wherein the analog-to-digital converter is also formed on the single integrated circuit chip.

15. An apparatus for processing digital image data, comprising:
a sensor including an array of photodetectors that generate a plurality of signals proportional to an intensity of light incident on the sensor for an image;
an optical system positioned to direct the light onto the sensor for the image;
a first memory receiving and temporarily storing at least one value for each of a plurality of color components of the light for the image;
a processor that reads the at least one value stored in the first memory and compresses the at least one value independently for each color component of each of a plurality of strips that form the image, based at least in part on at least one quantization table for each color component that is adjusted with an adjustable scale value for each of the plurality of strips of the image;
a second memory that stores the compressed at least one value; and
a communications device connected to the second memory that enables communication of the compressed at least one value with another apparatus.

16. The apparatus of claim 15, wherein the other apparatus is an image processing workstation.

17. The apparatus of claim 15, further comprising an analog-to-digital converter configured to receive the signals from the sensor and to provide the at least one value to the processor and the first memory.

18. The apparatus of claim 15, wherein the second memory is a non-volatile memory permanently connected within the apparatus.

19. The apparatus of claim 15, wherein the second memory further stores at least one optical characteristic used to form the image on the sensor.

20. The apparatus of claim 15, wherein the quantization table is adjusted with a first scale value when compressing values from a first strip of the plurality of strips of the image and wherein the quantization table is adjusted with a second value when compressing values from a second strip of the plurality of strips of the image, wherein the first scale value differs from the second scale value.

21. A system for processing digital image data, comprising:
an image processing workstation; and
an apparatus, including:
a sensor including an array of photodetectors that generate a plurality of signals proportional to an intensity of light incident on the sensor for an image;
an optical system positioned to direct the light onto the sensor for the image;
a first memory receiving and temporarily storing at least one value for each of a plurality of color components of the light for the image;
a processor that reads the at least one value stored in the first memory and compresses the at least one value independently for each color component of each of a plurality of strips that form the image, based at least in part on at least one quantization table for each color component that is adjusted with an adjustable scale value for each of the plurality of strips of the image;
a second memory that stores the compressed at least one value; and
a communications device connected to the second memory that enables communication of the compressed at least one value with the image processing workstation.

* * * * *

UNITED STATES PATENT AND TRADEMARK OFFICE
CERTIFICATE OF CORRECTION

| | |
|---|---|
| PATENT NO. | : 8,120,669 B2 |
| APPLICATION NO. | : 12/572117 |
| DATED | : February 21, 2012 |
| INVENTOR(S) | : Ohad Meitav et al. |

It is certified that error appears in the above-identified patent and that said Letters Patent is hereby corrected as shown below:

In column 9, line 61, delete "effect. on" and insert -- effect on --, therefor.

In column 10, line 61, delete "support. data" and insert -- support data --, therefor.

In column 11, line 6, delete "final. pictures" and insert -- final pictures --, therefor.

In column 12, line 26, delete "because off" and insert -- because of --, therefor.

In column 14, line 61, delete "$G_R$" and insert -- $G_R$, --, therefor.

In column 15, line 65, delete "111" and insert -- 11 --, therefor.

In column 19, line 47, delete "then' used" and insert -- then used --, therefor.

In column 20, line 8, delete "incorporating," and insert -- incorporating --, therefor.

In column 21, line 19, in Claim 12, delete "hand held" and insert -- hand-held --, therefor.

In column 21, line 36, in Claim 12, delete "color;" and insert -- colors; --, therefor.

Signed and Sealed this
Seventeenth Day of April, 2012

David J. Kappos
*Director of the United States Patent and Trademark Office*